(12) United States Patent
Kihara

(10) Patent No.: US 10,610,814 B2
(45) Date of Patent: Apr. 7, 2020

(54) AIR FILTER MATERIAL

(71) Applicant: UNITIKA LTD., Amagasaki-shi, Hyogo (JP)

(72) Inventor: Yukihiro Kihara, Okazaki Aichi (JP)

(73) Assignee: UNITIKA LTD., Hyogo (JP)

( * ) Notice: Subject to any disclaimer, the term of this patent is extended or adjusted under 35 U.S.C. 154(b) by 0 days.

(21) Appl. No.: 16/223,999

(22) Filed: Dec. 18, 2018

(65) Prior Publication Data

US 2019/0184317 A1 Jun. 20, 2019

Related U.S. Application Data

(62) Division of application No. 15/300,164, filed as application No. PCT/JP2014/059486 on Mar. 31, 2014, now abandoned.

(51) Int. Cl.
*B32B 5/26* (2006.01)
*B32B 7/12* (2006.01)
(Continued)

(52) U.S. Cl.
CPC ....... *B01D 39/163* (2013.01); *B01D 39/1623* (2013.01); *B01D 46/546* (2013.01);
(Continued)

(58) Field of Classification Search
CPC ................ B01D 39/163; B01D 46/546; B01D 39/1623; B01D 2239/0681;
(Continued)

(56) References Cited

U.S. PATENT DOCUMENTS

| | | |
|---|---|---|
| 3,169,089 A | 2/1965 | Miller et al. |
| 3,940,302 A | 2/1976 | Matthews et al. |
| | (Continued) | |

FOREIGN PATENT DOCUMENTS

| | | |
|---|---|---|
| EP | 0661391 B1 | 7/1995 |
| EP | 0 854 213 A1 | 7/1998 |
| | (Continued) | |

OTHER PUBLICATIONS

International Search Report for PCT/JP2014/059486, dated Nov. 18, 2014.
(Continued)

*Primary Examiner* — Minh Chau T Pham
(74) *Attorney, Agent, or Firm* — Hamre, Schumann, Mueller & Larson, P.C.

(57) ABSTRACT

An air filter material has spun bond nonwoven fabric and melt blown nonwoven fabric. The spun bond nonwoven fabric includes conjugate polyester continuous filaments having a "Y4"-like cross sectional shape. The Y-4 shape of the continuous filament is composed of plural nearly V-shape portions formed from low melting point polyester, joined by a nearly + shape portion formed from high melting point polyester. The continuous filaments are heat-bonded with each other by the low melting point polyester. The spun bond nonwoven fabric is bonded with the melt blown nonwoven fabric with a powder type or spider web type hot melt adhesive agent.

3 Claims, 2 Drawing Sheets

(51) Int. Cl.
*B01D 39/16* (2006.01)
*B32B 5/02* (2006.01)
*B01D 46/54* (2006.01)

(52) U.S. Cl.
CPC ............... *B32B 5/022* (2013.01); *B32B 5/26* (2013.01); *B32B 7/12* (2013.01); *B01D 2239/025* (2013.01); *B01D 2239/0618* (2013.01); *B01D 2239/0668* (2013.01); *B01D 2239/0681* (2013.01); *B01D 2239/1233* (2013.01); *B01D 2239/1291* (2013.01); *B01D 2275/10* (2013.01); *B32B 2262/0253* (2013.01); *B32B 2262/0276* (2013.01); *B32B 2307/724* (2013.01)

(58) Field of Classification Search
CPC .... B01D 2239/1233; B01D 2239/0618; B01D 2239/0668; B01D 2239/1291; B01D 2239/025; B01D 2275/10; B32B 5/022; B32B 5/26; B32B 7/12; B32B 2262/0253; B32B 2262/0276; B32B 2307/724
USPC .......... 55/522–529, DIG. 5; 156/62.8, 308.2; 210/491, 767; 264/438, DIG. 48
See application file for complete search history.

(56) References Cited

U.S. PATENT DOCUMENTS

| | | | |
|---|---|---|---|
| 4,791,026 A | 12/1988 | Yoshimoto et al. | |
| 5,057,368 A | 10/1991 | Largman et al. | |
| 5,176,926 A | 1/1993 | Tung | |
| 5,277,976 A | 1/1994 | Hogle et al. | |
| 5,532,035 A | 7/1996 | Corbin et al. | |
| 5,707,735 A | 1/1998 | Midkiff et al. | |
| 6,093,491 A | 7/2000 | Dugan et al. | |
| 6,309,377 B1 | 10/2001 | Tsujiyama et al. | |
| 2003/0064219 A1 | 4/2003 | Lee et al. | |
| 2005/0142325 A1 | 6/2005 | Veurink et al. | |
| 2007/0128404 A1 | 6/2007 | Tung et al. | |
| 2007/0254130 A1 | 11/2007 | Cheek | |
| 2007/0269631 A9 | 11/2007 | Pacione et al. | |
| 2009/0081406 A1 | 3/2009 | Higgins et al. | |
| 2011/0008620 A1 | 1/2011 | Wu | |
| 2011/0210081 A1* | 9/2011 | Green | B82Y 30/00 210/767 |
| 2014/0366732 A1 | 12/2014 | Geo et al. | |
| 2017/0151514 A1* | 6/2017 | Kihara | B32B 5/022 |

FOREIGN PATENT DOCUMENTS

| | | |
|---|---|---|
| JP | 54-151617 A | 11/1979 |
| JP | S63295712 A | 12/1988 |
| JP | H0593356 A | 4/1993 |
| JP | H09256255 A | 9/1997 |
| JP | H10273863 A | 10/1998 |
| JP | 2001181956 A | 7/2001 |
| JP | 2002-1020 A | 1/2002 |
| JP | 2002001020 A | 1/2002 |
| JP | 2005287745 A | 10/2005 |
| JP | 2007224474 | 9/2007 |
| JP | 2008-266812 A | 11/2008 |
| JP | 2013-76182 A | 4/2013 |
| JP | 2013076182 A | 4/2013 |
| WO | 2007/086429 A1 | 8/2007 |
| WO | 0190464 A2 | 11/2011 |

OTHER PUBLICATIONS

The extended European Search Report issued in European Patent Application No. 14887877.0 dated Nov. 8, 2017, 5 pages provided.
Extended European Search Report, dated Nov. 4, 2016, European Patent Application No. 13882225.9 (5 pages).
International Search Report, PCT/JP2013/084781, dated Mar. 18, 2014 (2 pages).

* cited by examiner

AIR FILTER MATERIAL

TECHNICAL FIELD

The present invention is related to an air filter material for filtering gas, such as air and the like, particularly to a middle efficiency or high efficiency air filter material.

BACKGROUND ART

Nonwoven fabric formed from ultrafine fibers has been employed for middle efficiency or high efficiency air filter material. In particularly, the nonwoven fabric can be so-called melt blown nonwoven fabric. Since the melt blown nonwoven fabric is consisted from ultrafine fibers, tensile strength or tear strength is poor and the fabric is difficult to treat. Accordingly, the melt blown fabric is laminated with another nonwoven fabric composed of filaments or fibers having high fineness, such as spun bonded nonwoven fabric or nonwoven fabric of staple fibers obtained by card method (Patent Literature 1).

In the technique of Patent Literature 1, laminating and integrating a melt blown nonwoven fabric with a spun bond nonwoven fabric or the like is conducted by heat compression. In particular, a sheath-core conjugate filament composed of a high melting point polyester as a core component and a low melting point polyester as a sheath component is used as a constituent fiber of the spun bond nonwoven fabric, and the spun bonded nonwoven fabric is laminated with a melt blown nonwoven fabric and passed through a pair of heat embossed rolls to press and heat the laminated fabrics, wherein the low melting point polyester component is used as an adhesive agent and molten and solidified to laminate and integrate the melt blown nonwoven fabric with the spun bond nonwoven fabric. However, since a portion of the constituent filaments is molten, some openings present in the spun bond nonwoven fabric are filled with the molten low melting point polyester, thus reducing the air permeability of the obtained air filter material.

In order to prevent the reduction of the air permeability, adhesive component is changed from the portion of the constituent filaments of the spun bond nonwoven fabric to the other adhesive agent to bond and to integrate the melt blown nonwoven fabric with the spun bond nonwoven fabric. For example, the other adhesive agent may include emulsion type adhesive agent or hot melt adhesive agent. However, even if such adhesive agents are employed, the adhesive agent might be flown out and filled in the openings of the spun bond nonwoven fabric, thus reducing air permeability.

CITATION LIST

Patent Literature

[PTL 1]
WO2007/086429

SUMMARY OF INVENTION

Technical Problem

An object of the present invention is to provide an air filter material in which spun bond nonwoven fabric and melt blown nonwoven fabric are laminated and integrated without reducing the air permeability.

Solution to Problem

The present invention solves the above mentioned problem by employing a combination of a specific spun bond nonwoven fabric with a specific hot melt adhesive agent. That is, the present invention is to provide an air filter material comprising ultrafine fiber nonwoven fabric formed from ultrafine fibers and polyester nonwoven fabric formed from polyester continuous filaments, the ultrafine fiber nonwoven fabric being laminated and integrated with the polyester nonwoven fabric, a shape of the polyester continuous filament in the cross section is the following has a nearly 'Y4' shape in which the bottom ends of the nearly 'Y' parts are connected to up, down, left and right as shown in FIG. 1, and the polyester continuous filaments are heat bonded with each other, the ultrafine fiber nonwoven fabric is bonded with the polyester nonwoven fabric by powder type or spider web type hot melt adhesive agent having a melting point lower than the melting points of the ultrafine fiber and the polyester continuous filament.

The polyester nonwoven fabric for forming the air filter material of the present invention contains polyester continuous filaments having a specific cross sectional shape as constituent filaments. The cross sectional shape has four nearly Y shapes as shown in FIG. 2. The nearly Y shape has a bottom end 1 which is connected with the other nearly Y shapes in the directions of up, down, left and right to form the nearly Y4 shape as shown in FIG. 1. The nearly Y4 shape has four concave portions 2, eight convex portions 3 and four small concave portions 4. Especially, the four concave portions 2 form relatively large opening portions in or with the polyester continuous filaments.

It is preferred that the polyester continuous filament is composed of a low melting point polyester component and a high melting point polyester component. That is, the polyester continuous filament is preferably a conjugate polyester continuous filament in which nearly V shape portions 6 of the cross sectional shape is formed from the low melting point polyester component and a nearly + shape portion 5 is formed from the high melting point polyester component. The polyester nonwoven fabric used in the present invention can be produced by collecting conjugate type continuous filaments which are melt-spun through conjugate type spinning nozzles, and softening or melting the low melting point polyester, followed by solidifying, whereby the polyester continuous filaments are heat-bonded with each other by the low melting point polyester components. The resulting polyester nonwoven fabric are excellent in mechanical properties, such as tensile strength or tear strength and excellent in treatment ability, because the polyester continuous filaments are bonded each other by the heat bonding of the low melting point polyester components.

The heat bonding of the low melting point polyester components can be conducted by a heat treatment such as heat embossing process or heat air treatment. In the heat embossing process, heat pressing portions are partially present and in the heat pressing portions, the polyester continuous filaments are heat bonded at crossing points of polyester continuous filaments. In addition, in the heat air treatment, the polyester continuous filaments are heat bonded with each other as a whole. The heat embossing process can be combined with the heat air treatment and may be used together. In the present invention, preferred is the heat embossing process wherein heat pressing is partially conducted by applying heat and pressure, in order to enhance the mechanical properties of the polyester nonwoven fabric.

A pressure bonding area ratio of the embossing roll employed (an area ratio of protruding portions of the embossing roll) may preferably be within the range of 10 to 20%. When the pressure bonding area ratio is too small, the mechanical properties, such as tensile strength and the like, would be deteriorated. When the pressure bonding area ratio is too high, the resulting nonwoven fabric has a very small opening area between polyester continuous filaments, thus reducing the air permeability.

A conjugate ratio of the low melting point polyester component and the high melting point polyester component both constituting the polyester continuous filament may preferably be within the range of 1/4 to 1/1 (mass ratio) in low melting point polyester component/high melting point polyester component. When the amounts of the low melting point polyester component are low, the physical properties, such as tensile strength, of the polyester nonwoven fabric would be deteriorated. When they are larger than the upper limit, the low melting point polyester components are flown out in the openings among the polyester continuous filaments by heat treatment and the air permeability would be reduced.

The polyester nonwoven fabric can be manufactured by any methods known to the art, such as spun bond method, with the exception that a nozzle orifice using at a time of melt spinning is changed. That is, in a method wherein conjugate type continuous filaments obtained by a conjugate melt spinning of the low melting point polyester and the high melting point polyester are accumulated to form a spun bond nonwoven fabric, a nozzle orifice shape as shown in FIG. 3 was used for the melt spinning. The figure of the nozzle orifice in FIG. 3 is said 'Y4' figure in which the bottom ends of 'Y' parts are connected to up, down, left and right, besides the '╱' parts of the adjacent 'Y' parts are paralleled and the '╲' parts of the adjacent 'Y' parts are paralleled.

The nozzle orifice has four 'Y' parts as shown in FIG. 4. The bottom ends of 'Y' parts are connected to up, down, left and right to become 'Y4' figure. As shown in FIG. 3, the '╱' parts 8, 8 of the adjacent 'Y' parts are paralleled with each other, and the '╲' parts 9, 9 of the adjacent 'Y' parts are paralleled with each other. The polyester resin is provided and melt spun in the nozzle orifice which has 'Y4' figure to become the polyester filament having the nearly 'Y4' shape in the cross section. Especially, the polyester filament has the four big concave sections 2 because the '╱' parts 8, 8 of the nozzle orifice are paralleled and the '╲' parts 9, 9 are parallel. In addition, the polyester filament has the nearly '+' part 5 and the nearly 'V' parts 6 joined to the each tip of '+' part 5. The low melting point polyester resin is provided in 'V' parts 10 of the nozzle orifice and the high melting point polyester resin is provided in a '+' part 11 of the nozzle orifice. After melt spinning, the conjugate continuous polyester filament in which the nearly 'V' parts 6 are formed from the low melting point polyester and the nearly '+' part 5 is formed from the high melting point polyester is obtained.

After the conjugate continuous polyester filaments are obtained, the filaments are accumulated to form a filamentous web. The filamentous web is then subjected to a heat treatment in which the low melting point polyester components of the conjugate polyester filament are molten or softened, and cooled to solidify. Then, the conjugate polyester filaments are bonded with each other by the low melting point polyester components to manufacture the polyester nonwoven fabric of the continuous polyester filaments. If necessary, a small amount of a binder agent may be applied to the nonwoven fabric.

The continuous polyester filament preferably has a fineness of not less than 10 dtex, more preferably not less than 15 dtex. When the continuous polyester filament has a fineness of less than 10 dtex, air permeability and mechanical properties would be deteriorated. An upper limit of the fineness is not limited, but it may preferably be about 30 dtex. If the fineness is more than 30 dtex, it is not easy to cool the continuous polyester filament in the melt spinning process, thus resulting in poor productivity.

The polyester nonwoven fabric preferably has a weight of 30 $g/m^2$ to 130 $g/m^2$. Weights of less than 30 $g/m^2$ would reduce mechanical properties and those of more than 130 $g/m^2$ would be too heavy and would make the treatment of the fabric difficult.

The ultrafine fiber nonwoven fabric can be any types known to the art, especially melt blown nonwoven fabric. The ultrafine fiber can be formed from polyolefin (such as polypropylene), polyester or the like. The ultrafine fiber may have a fiber diameter (converting it into a circular fiber diameter) of 1 to 5 micrometers. The fiber diameters of more than 5 micrometers would not obtain the middle efficiency or high efficiency air filter materials. Those of less than 1 micrometer would reduce productivity.

The ultrafine fiber fabric preferably has a weight of 10 $g/m^2$ to 30 $g/m^2$. Weights of less than 10 $g/m^2$ would not obtain the middle efficiency or high efficiency air filter materials. Those of more than 30 $g/m^2$ would reduce productivity.

The ultrafine fiber nonwoven fabric and the polyester nonwoven fabric are bonded by the powder type or spider web type hot melt adhesive agent. The adhesive agent has to have a melting point lower than the melting points of the ultrafine fiber and the polyester continuous filament. For example, when the ultrafine fiber nonwoven fabric is formed from polypropylene ultrafine fibers, the hot melt adhesive agent has to have a melting point of lower than the polypropylene ultrafine fibers. The melting point of the hot melt adhesive agent is preferably within the range of 50 to 120° C. In the case where the melting point of the hot melt adhesive agent is higher than those of the ultrafine fiber and the polyester continuous filament, it is not preferred that, when the hot melt adhesive agent is molten or soften to bond the ultrafine fiber nonwoven fabric with the polyester nonwoven fabric, the ultrafine fiber nonwoven fabric or the polyester nonwoven fabric would be heat deformed before the melting or softening of the adhesive agent, to reduce filterability of the obtained filter. The hot melt adhesive agent has to be powder type or spider web type. This is because the reduction of the air permeability of the air filter material is prevented by keeping area portions where no adhesive agent is present. For example, if a film type hot melt adhesive agent is employed to bond the ultrafine fiber nonwoven fabric with the polyester nonwoven fabric, the hot melt adhesive agent would be present all over the surface and would severely deteriorate the air permeability of the air filter material.

An application amount of the hot melt adhesive agent may preferably be within the range of 1 to 30 $g/m^2$. Application amounts of less than 1 $g/m^2$ would easily peel off the bonding of the ultrafine fiber nonwoven fabric and the polyester nonwoven fabric. Those of more than 30 $g/m^2$ would reduce the air permeability because the areas where no adhesive agent is present are reduced.

The air filter material of the present invention is employed as air filter by methods known to the art. For example, the air filter material may be cut into a suitable size and is equipped in a filter frame to use as an air filter in a clean room. In addition, the air filter material of the present invention is subjected to pleating process and fixed in a filter frame to use an air filter for a dust collection machine, an automobile or the like.

Advantageous Effects of Invention

The air filter material of the present invention is composed of the polyester nonwoven fabric formed from the polyester filaments having a specific cross section, the ultrafine fiber nonwoven fabric being laminated and integrated with the polyester nonwoven fabric by using a specific hot melt adhesive agent. The air filter material has technical effects that the air permeability is not easily reduced.

EXAMPLES

Next, the present invention will be explained in detail based on working examples of the present invention. Physical properties in the examples are determined as follow:
(1) Melting point (° C.):
A melting point was determined to be a temperature indicating a maximum value of a melting endothermic peak measured at a rising temperature speed of 20° C./min using a differential scanning calorimeter DSC-7 manufactured by Perkin Elmer Co., Ltd.
(2) Relative viscosity [ηrel]:
A sample of 0.5 g was dissolved in 100 ml of a mixture solution of phenol and ethane tetrachloride in an equal amount ratio and a relative viscosity was determined by a conventional method at a temperature of 20° C.
(3) Air permeability (cc/m²/sec):
An air permeability was determined by a Frazier Type Air Permeability Tester, according to JIS L 1096-1979 "Testing methods for woven and knitted fabrics", keeping at 1.27 cm of an inclined type barometer.

Production Example A of Polyester Nonwoven Fabric

A low melting point polyester was prepared by copolymerizing 92 mol % of terephthalic acid and 8 mol % of isophthalic acid, as a dicarboxylic acid, with 100 mol % of ethylene glycol, as a diol. The low melting point polyester had a melting point of 230° C. and a relative viscosity [ηrel] of 1.44. Four % by mass of titanium oxide as a nucleating agent was added into the low melting point polyester, which was employed as the low melting point polyester component.

A high melting point polyester was prepared by copolymerizing 100 mol % of terephthalic acid as a dicarboxylic acid with 100 mol % of ethylene glycol as a diol. The high melting point polyester had a melting point of 260° C. and a relative viscosity [ηrel] of 1.38, which was employed as the high melting point polyester component.

The low melting point polyester component was provided and melt spun in 'V' parts shown FIG. 3 of the nozzle orifice and the high melting point polyester component was provided in a '+' part shown FIG. 3. The melt spinning was performed by providing the two types of polyester at the rate of 8.33 g/min. per nozzle orifice and at 285° C. A mass ratio of the low melting point polyester component/the high melting point polyester component was 1/2.

The continuous filaments spun from the nozzle orifices were passed in an air sucker device located 2 m below the nozzle orifices and drawn into 17 dtex in fineness to form conjugate continuous filaments which had a cross section as shown in FIG. 1. The conjugate continuous filaments were opened by an opening device, and accumulated on a moving net conveyor to obtain a continuous filamentous web. The filamentous web was passed between an embossing roll and a flat roll as a heat embossing device to obtain a polyester nonwoven fabric A. The embossing roll had convex tips which had the area of 0.7 mm², and a total area of the convex parts was occupied 15 percent of the entire surface of the embossing roll. The embossing conditions were a surface temperature of 213° C. and a linear pressure of 300 N/cm. The polyester nonwoven fabric A had a weight of 40 g/m².

Production Example B of Polyester Nonwoven Fabric B

A polyester nonwoven fabric was obtained as generally described in Production Example A, with the exception that the weight of the final polyester nonwoven fabric A was changed to 70 g/m².

Production Example of Ultrafine Fiber Nonwoven Fabric

Polypropylene having a melting point of 162° C. was introduced into a melt blown die from which heated air was blown, to form ultrafine fibers having a diameter of about 3 micrometers. The ultrafine fibers were accumulated on a moving conveyor to obtain an ultrafine fiber nonwoven fabric having a weight of 20 g/m².

Example 1

The ultrafine fiber nonwoven fabric was spray-coated with powder type hot melt adhesive agent (powder formed from low density polyethylene having a melting point of about 100° C.) in a spray-coating amount of 5 g/m², and then laminated thereon with the polyester nonwoven fabric A to obtain a layered laminate. The laminate was put on a lower conveyor combined with an upper conveyor in a heat treatment device, both conveyors being covered with Teflon coating on the surfaces, and heated with moving. A temperature of the space between the upper conveyor and the lower conveyor was controlled to 100° C. and the space was gradually narrowed from an entrance to an exit to set a width of the space of 1 mm at the exit.

After the heat treatment device, the layered laminate was cooled to obtain an integrated air filter material composed of the ultrafine fiber nonwoven fabric and the polyester nonwoven fabric. The air filter material had an air permeability of 26.5 cc/m²/sec. Since the ultrafine fiber nonwoven fabric was firmly integrated with the polyester nonwoven fabric A, the ultrafine fiber nonwoven fabric was damaged when it was peeled off from the polyester nonwoven fabric.

Example 2

An air filter material was obtained as generally described in Example 1, with the exception that the polyester nonwoven fabric A was changed to the polyester nonwoven fabric B. The resulting air filter material had an air permeability of 25.7 cc/m²/sec. The ultrafine fiber nonwoven fabric was firmly integrated with the polyester nonwoven fabric B.

Example 3

An air filter material was obtained as generally described in Example 1, with the exception that a spray-coating amount of the powder type hot melt adhesive agent (powder formed from low density polyethylene having a melting point of about 100° C.) was changed to 10 g/m². The resulting air filter material had an air permeability of 25.3 cc/m²/sec. The ultrafine fiber nonwoven fabric was firmly integrated with the polyester nonwoven fabric A.

Example 4

An air filter material was obtained as generally described in Example 2, with the exception that a spray-coating amount of the powder type hot melt adhesive agent (powder formed from low density polyethylene having a melting point of about 100° C.) was changed to 10 g/m². The resulting air filter material had an air permeability of 25.0 cc/m²/sec. The ultrafine fiber nonwoven fabric was firmly integrated with the polyester nonwoven fabric B.

Example 5

An air filter material was obtained as generally described in Example 1, with the exception that the powder type hot melt adhesive agent (powder formed from low density polyethylene having a melting point of about 100° C.) was changed to a spider web type hot melt adhesive agent (available from Kurehatech Ltd. as Item Stock Number LNS0020, based on copolymerized polyamide, melting point 115° C., coating amount 20 g/m²). The resulting air filter material had an air permeability of 23.7 cc/m²/sec. The ultrafine fiber nonwoven fabric was firmly integrated with the polyester nonwoven fabric A.

Example 6

An air filter material was obtained as generally described in Example 2, with the exception that the powder type hot melt adhesive agent (powder formed from low density polyethylene having a melting point of about 100° C.) was changed to a spider web type hot melt adhesive agent (available from Kurehatech Ltd. as Item Stock Number LNS0020, based on copolymerized polyamide, melting point 115° C., coating amount 20 g/m²). The resulting air filter material had an air permeability of 23.9 cc/m²/sec. The ultrafine fiber nonwoven fabric was firmly integrated with the polyester nonwoven fabric B.

As is apparent from the above Examples 1 to 6, the ultrafine fiber nonwoven fabric and the polyester nonwoven fabric A or B are laminated and integrated using powder type or spider web type hot melt adhesive agent to obtain an air filter material having excellent air permeability.

REFERENCE SIGNS LIST

Figure 1:
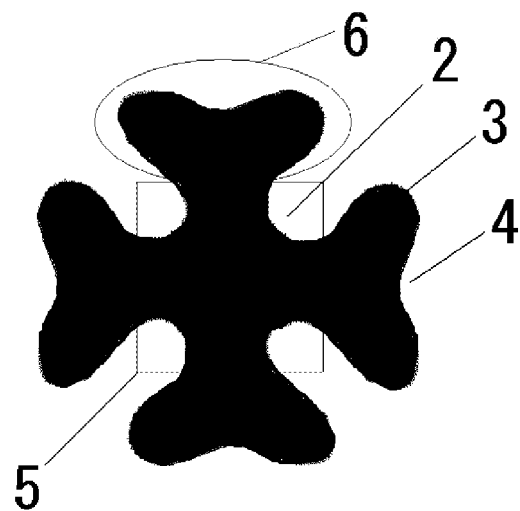
FIG. 1 is a cross sectional view of a continuous filament used in the invention.
Figure 2:
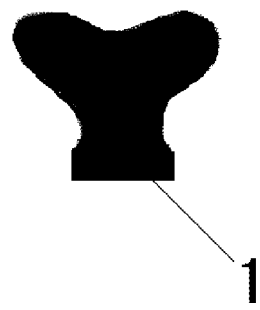
FIG. 2 is one nearly 'Y' part in the nearly 'Y4' shape which is the cross sectional view of the continuous filament used in the invention.
Figure 3:
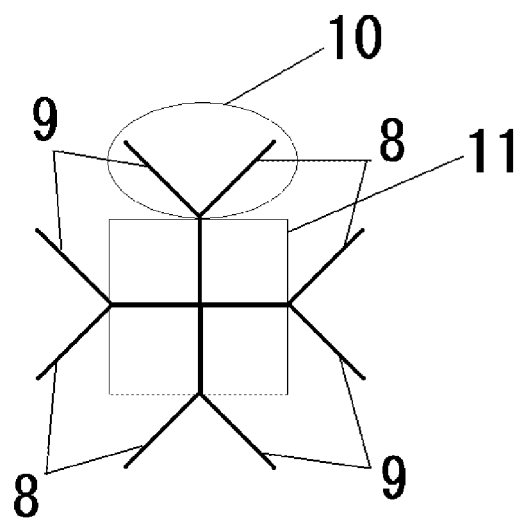
FIG. 3 is the 'Y4' figure of the nozzle orifice.
Figure 4:
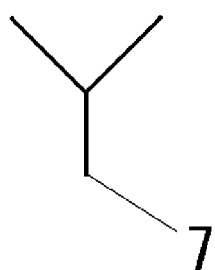
FIG. 4 is one 'Y' part in the 'Y4' figure of the nozzle orifice.

1 Bottom end of the nearly 'Y' shape in a cross sectional shape of the continuous filament,
2 Concave portion formed in the nearly 'Y4' shape,
3 Convex portion formed in the nearly 'Y4' shape,
4 Small concave portion formed in the nearly 'Y4' shape,
5 Nearly+shape portion formed in the nearly 'Y4' shape,
6 Nearly V shape portion formed in the nearly 'Y4' shape,
7 Bottom end in the Y4 shape being a nozzle orifice when melt spinning,
8 '\' part of the 'Y' shape,
9 '/' parts of the 'Y' shape,
10 'V' part in the 'Y' shape,
11 '+' part in the 'Y' shape.

The invention claimed is:

1. A process for producing an air filter comprising:
    applying a powder type or spider web type hot melt adhesive agent in solid form on ultrafine fiber nonwoven fabric formed from ultrafine fibers having a fiber diameter of 1 to 5 micrometers; and
    placing polyester nonwoven fabric on the powder type or spider web type hot melt adhesive agent, the polyester nonwoven fabric formed from polyester continuous filaments having a fineness of not less than 10 dtex, a shape of the polyester continuous filament in a cross section has four parts, each part having:
        a first portion with a first end and a second end, and
        two convex portions that each extend from the first end of the first portion, the convex portions extending in different directions such that a concavity is formed between the convex portions, wherein
        the second ends of the four parts are interconnected, and the four parts are connected together such that a concavity is formed between each adjacent pair of the parts, and
        the polyester continuous filaments are heat-bonded with each other; and
    bonding the ultrafine fiber nonwoven fabric and the polyester nonwoven fabric by the powder type or spider web type hot melt adhesive agent, with the polyester nonwoven fabric being on the hot melt adhesive agent, wherein
    the powder type or spider web type hot melt adhesive agent has a melting point lower than the melting points of the ultrafine fiber and the polyester continuous filament.

2. The process according to claim 1, wherein the polyester continuous filament is a conjugate polyester continuous filament in which the convex portions are formed from low melting point polyester and the first portions are formed from high melting point polyester.

3. The process according to claim 1, wherein the conjugate polyester continuous filaments are bonded to each other by heat bonding of the low melting point polyester.

* * * * *